US012659815B2

(12) United States Patent
Majumdar et al.

(10) Patent No.: US 12,659,815 B2
(45) Date of Patent: Jun. 16, 2026

(54) INTERRUPTION TIME REDUCTION

(71) Applicant: Nokia Technologies Oy, Espoo (FI)

(72) Inventors: Chitradeep Majumdar, Bangalore (IN); Umur Karabulut, Munich (DE); Ingo Viering, Munich (DE); Panagiotis Spapis, Munich (DE); Christian Rom, Aalborg (DK); Sanjay Goyal, Murray Hill, NJ (US); Tero Henttonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 316 days.

(21) Appl. No.: 18/420,961

(22) Filed: Jan. 24, 2024

(65) Prior Publication Data

US 2024/0259891 A1 Aug. 1, 2024

(30) Foreign Application Priority Data

Jan. 31, 2023 (IN) .............................. 202341006135

(51) Int. Cl.
*H04W 36/00* (2009.01)
*H04W 36/08* (2009.01)
*H04W 56/00* (2009.01)

(52) U.S. Cl.
CPC ....... *H04W 36/0058* (2018.08); *H04W 36/08* (2013.01); *H04W 56/0015* (2013.01); *H04W 56/0045* (2013.01)

(58) Field of Classification Search
CPC ............. H04W 36/0058; H04W 36/08; H04W 56/0015; H04W 56/0045; H04W 88/085;

(Continued)

(56) References Cited

U.S. PATENT DOCUMENTS

2014/0126547 A1* 5/2014 Tamura ............. H04W 36/0058
370/332
2017/0126338 A1* 5/2017 Zaidi .................... H04B 17/328
(Continued)

FOREIGN PATENT DOCUMENTS

WO 2021/160263 A1 8/2021
WO 2022/012832 A1 1/2022
WO 2023/104800 A1 6/2023

OTHER PUBLICATIONS

"3rd Generation Partnership Project; Technical Specification Group Radio Access Network; NR; Radio Resource Control (RRC) protocol specification (Release 17)", 3GPP TS 38.331, V17.3.0, Dec. 2022, pp. 1-1318.

(Continued)

*Primary Examiner* — Nimesh Patel
(74) *Attorney, Agent, or Firm* — Barta Jones, PLLC

(57) ABSTRACT

Embodiments of the present disclosure relate to devices, methods, apparatuses and computer readable storage media of interruption time reduction. The method comprises receiving, at a terminal device and from a centralized network device, a configuration at least indicating that a L1 measurement for cell change is to be reported by the terminal device with an indication of interruption free TA acquisition for a cell associated with the cell change, or per a panel indication of the terminal device; and transmitting, to a distributed network device, a report of the L1 measurement based on the configuration.

10 Claims, 6 Drawing Sheets

(58) Field of Classification Search

CPC ............. H04W 24/10; H04W 36/0072; H04W 36/0055; H04W 36/0085; H04W 36/087; H04W 36/00; H04W 36/0061; H04W 36/0077; H04W 36/04; H04W 36/30; H04W 36/085; H04W 36/0069; H04W 24/02; H04W 72/23; H04W 16/28; H04W 36/324; H04W 72/232; H04W 36/249; H04W 56/001; H04W 36/06; H04W 76/19; H04W 36/0005; H04W 36/32; H04W 48/20; H04W 36/18; H04W 36/0016; H04W 36/00692; H04W 36/36; H04W 72/044; H04W 74/0891; H04W 56/005; H04W 36/0083; H04W 36/008355; H04W 36/00838; H04W 72/12; H04W 36/302; H04W 36/34; H04W 48/08; H04W 52/0206; H04W 72/1273; H04W 72/542; H04W 74/002; H04W 12/61; H04W 36/0066; H04W 84/22; H04W 76/38; H04W 74/0836; H04W 8/24; H04W 76/27; H04W 36/185; H04W 74/006; H04W 80/02; H04W 74/004; H04W 36/0064; H04W 36/00837; H04W 36/0094; H04W 36/24; H04W 48/12; H04W 56/0005; H04W 28/06; H04W 36/00833; H04W 72/25; H04W 72/21; H04W 92/18; H04W 24/04; H04W 28/0236; H04W 28/0268; H04W 28/0967; H04W 36/13; H04W 52/0245; H04W 52/241; H04W 60/04; H04W 52/285; H04L 5/0053; H04L 1/1812; H04L 5/00; H04L 5/001; H04L 5/0048; H04L 5/0051; H04L 5/0057; H04L 5/0098; H04L 5/0023; H04L 5/0035; H04L 1/1832; H04L 1/1896; H04L 2209/80; H04L 5/0032; H04L 5/0085; H04L 5/0091; H04L 5/1469; H04L 5/0007; H04B 7/0626; H04B 7/06952; H04B 7/06968; H04B 7/18541; H04B 17/328; H04B 7/0695; H04B 7/088; H04B 17/318; H04B 7/0632; H04B 17/382; H04B 7/06; H04B 7/0696; H04B 7/0617; H04B 7/0413; H04B 7/0452; H04B 7/06956; Y02D 30/70; G06N 20/00; G06N 3/0464; G06N 3/08

See application file for complete search history.

(56) References Cited

U.S. PATENT DOCUMENTS

| | | | | |
|---|---|---|---|---|
| 2022/0174719 | A1 | 6/2022 | Zhang et al. | |
| 2023/0388871 | A1* | 11/2023 | Guo ................. | H04W 36/0069 |
| 2024/0224137 | A1* | 7/2024 | Chandrashekar ........................... | |
| | | | | H04W 36/00725 |
| 2024/0259891 | A1* | 8/2024 | Majumdar ........ | H04W 36/0058 |
| 2024/0267860 | A1* | 8/2024 | Wang ................ | H04W 36/0055 |
| 2024/0340830 | A1* | 10/2024 | Hu ...................... | H04W 56/001 |
| 2025/0274827 | A1* | 8/2025 | Abdul .............. | H04W 36/0079 |
| 2025/0338161 | A1* | 10/2025 | Zhou .................... | H04L 5/0048 |

OTHER PUBLICATIONS

"3rd Generation Partnership Project; Technical Specification Group Radio Access Network; NR; Requirements for support of radio resource management (Release 18)", 3GPP TS 38.133, V18.0.0, Dec. 2022, 5856 pages.

"3rd Generation Partnership Project; Technical Specification Group Radio Access Network; NG-RAN; Architecture description (Release 17)", 3GPP TS 38.401, V17.3.0, Dec. 2022, pp. 1-125.

"3rd Generation Partnership Project; Technical Specification Group Radio Access Network; NG-RAN; F1 application protocol (F1AP) (Release 17)", 3GPP TS 38.473, V17.3.0, Dec. 2022, pp. 1-688.

Abinader et al., "System-Level Analysis of mmWave 5G Systems with Different Multi-Panel Antenna Device Models", IEEE 93rd Vehicular Technology Conference (VTC2021-Spring), Apr. 25-28, 2021, 6 pages.

Patent Cooperation Treaty Application No. PCT/CN2023/074005, "Service Cluster Update", filed on Jan. 31, 2023, pp. 1-33.

Extended European Search Report received for corresponding European Patent Application No. 23216231.3, dated Jun. 3, 2024, 11 pages.

"Consideration on support of Intra-CU inter-DU L1/L2 based Inter-Cell Mobility", 3GPP TSG RAN WG3#117bis-e, R3-225421, Agenda: 14.2, China Telecom, Oct. 10-18, 2022, 4 pages.

"Enhancements on Multi-Beam Operations", 3GPP TSG RAN WG1 #106-e, R1-2107689, Agenda: 8.1.1, AT&T, Aug. 16-27, 2021, 9 pages.

"Enhancements to Multi-Beam Operation", 3GPP TSG RAN WG1 #105-e, R1-2104888, Agenda: 8.1.1, Intel Corporation, May 19-27, 2021, 27 pages.

* cited by examiner

400

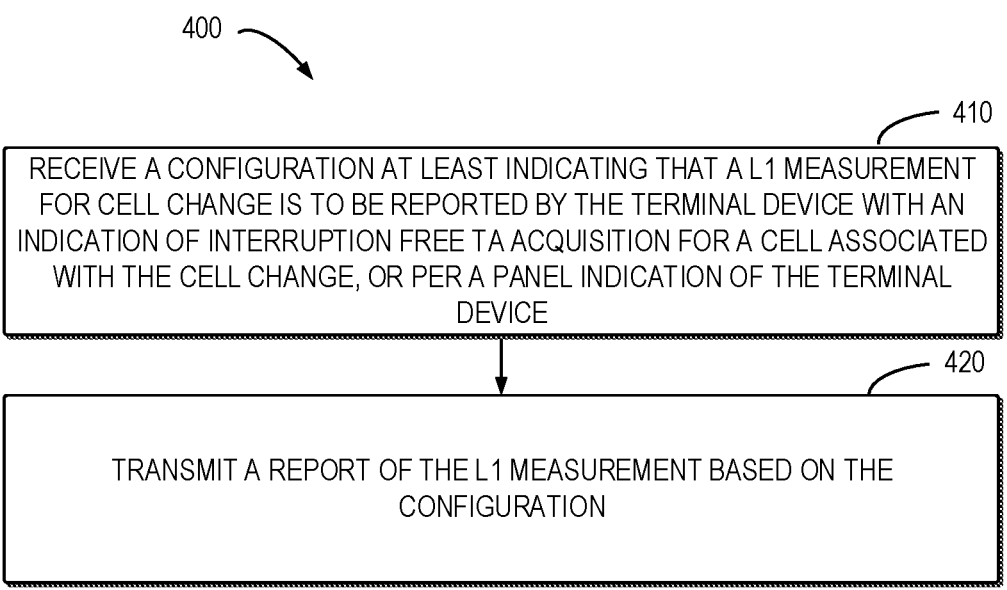

410

RECEIVE A CONFIGURATION AT LEAST INDICATING THAT A L1 MEASUREMENT FOR CELL CHANGE IS TO BE REPORTED BY THE TERMINAL DEVICE WITH AN INDICATION OF INTERRUPTION FREE TA ACQUISITION FOR A CELL ASSOCIATED WITH THE CELL CHANGE, OR PER A PANEL INDICATION OF THE TERMINAL DEVICE

420

TRANSMIT A REPORT OF THE L1 MEASUREMENT BASED ON THE CONFIGURATION

510

TRANSMIT A CONFIGURATION AT LEAST INDICATING THAT A L1 MEASUREMENT FOR CELL CHANGE IS TO BE REPORTED BY THE TERMINAL DEVICE WITH AN INDICATION OF INTERRUPTION FREE TA ACQUISITION FOR A CELL ASSOCIATED WITH THE CELL CHANGE, OR PER A PANEL INDICATION OF THE TERMINAL DEVICE

FIG. 5

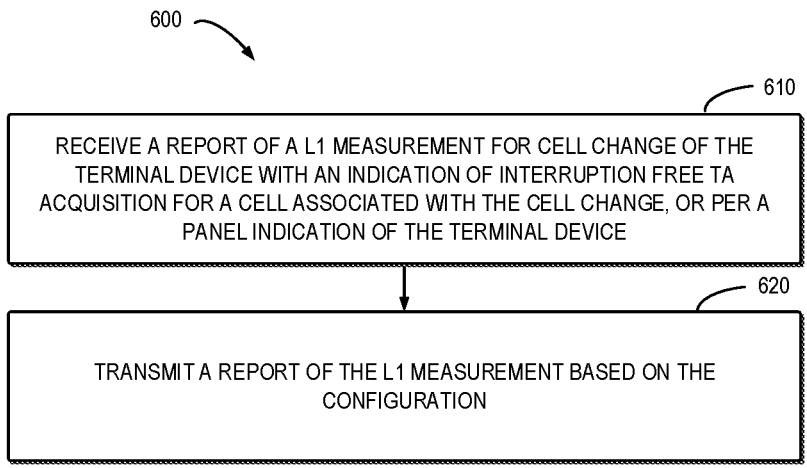

600

610

RECEIVE A REPORT OF A L1 MEASUREMENT FOR CELL CHANGE OF THE TERMINAL DEVICE WITH AN INDICATION OF INTERRUPTION FREE TA ACQUISITION FOR A CELL ASSOCIATED WITH THE CELL CHANGE, OR PER A PANEL INDICATION OF THE TERMINAL DEVICE

620

TRANSMIT A REPORT OF THE L1 MEASUREMENT BASED ON THE CONFIGURATION

FIG. 6

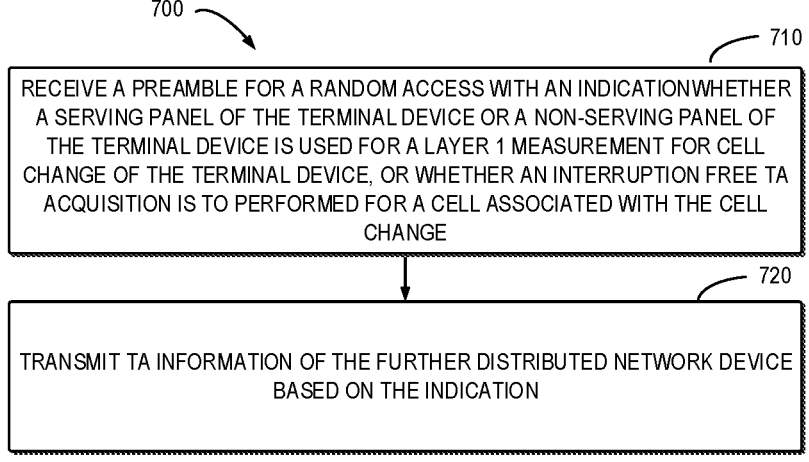

700

710

RECEIVE A PREAMBLE FOR A RANDOM ACCESS WITH AN INDICATION WHETHER A SERVING PANEL OF THE TERMINAL DEVICE OR A NON-SERVING PANEL OF THE TERMINAL DEVICE IS USED FOR A LAYER 1 MEASUREMENT FOR CELL CHANGE OF THE TERMINAL DEVICE, OR WHETHER AN INTERRUPTION FREE TA ACQUISITION IS TO PERFORMED FOR A CELL ASSOCIATED WITH THE CELL CHANGE

720

TRANSMIT TA INFORMATION OF THE FURTHER DISTRIBUTED NETWORK DEVICE BASED ON THE INDICATION

FIG. 7

INTERRUPTION TIME REDUCTION

FIELD

Embodiments of the present disclosure generally relate to the field of telecommunication and in particular to devices, methods, apparatuses and computer readable storage media of interruption time reduction.

BACKGROUND

For Layer 1 (L1)/Layer 2 (L2) triggered Mobility (LTM), it has been agreed that an early Timing Advance (TA) acquisition for one or more candidate cells is supported. During the early TA acquisition, the User Equipment (UE) may be configured to acquire the TA for candidate cell(s) before the cell switch command is received.

SUMMARY

In general, example embodiments of the present disclosure provide a solution of interruption time reduction in LTM for UEs with multi-panels.

In a first aspect, there is provided a terminal device. The terminal device comprises at least one processor; and at least one memory storing instructions that, when executed by the at least one processor, cause the terminal device at least to perform: receiving, from a centralized network device, a configuration at least indicating that a L1 measurement for cell change is to be reported by the terminal device with an indication of interruption free TA acquisition for a cell associated with the cell change, or per a panel indication of the terminal device; and transmitting, to a distributed network device, a report of the L1 measurement based on the configuration.

In a second aspect, there is provided a centralized network device. The centralized network device comprises at least one processor; and at least one memory storing instructions that, when executed by the at least one processor, cause the centralized network device at least to perform: transmitting, to a terminal device, a configuration at least indicating that a L1 measurement for cell change is to be reported by the terminal device with an indication of interruption free TA acquisition for a cell associated with the cell change, or per a panel indication of the terminal device.

In a third aspect, there is provided a distributed network device. The distributed network device comprises at least one processor; and at least one memory storing instructions that, when executed by the at least one processor, cause the distributed network device at least to perform: receiving, from a terminal device, a report of a L1 measurement for cell change of the terminal device with an indication of interruption free TA acquisition for a cell associated with the cell change, or per a panel indication of the terminal device; and causing an early synchronization to be triggered based on the report.

In a fourth aspect, there is provided a further distributed network device. The distributed network device comprises at least one processor; and at least one memory storing instructions that, when executed by the at least one processor, cause the further distributed network device at least to perform: receiving a preamble for a random access from a terminal device with an indication whether a serving panel of the terminal device or a non-serving panel of the terminal device is used for a layer 1 measurement for cell change of the terminal device, or whether an interruption free TA acquisition is to performed for a cell associated with the cell change; and transmitting TA information of the further distributed network device based on the indication.

In a fifth aspect, there is provide a method. The method comprises receiving, at a terminal device and from a centralized network device, a configuration at least indicating that a L1 measurement for cell change is to be reported by the terminal device with an indication of interruption free TA acquisition for a cell associated with the cell change, or per a panel indication of the terminal device; and transmitting, to a distributed network device, a report of the L1 measurement based on the configuration.

In a sixth aspect, there is provide a method. The method comprises transmitting, from a centralized network device and to a terminal device, a configuration at least indicating that a L1 measurement for cell change is to be reported by the terminal device with an indication of interruption free TA acquisition for a cell associated with the cell change, or per a panel indication of the terminal device.

In a seventh aspect, there is provided a method. The method comprises receiving, at a distributed network device and from a terminal device, a report of a L1 measurement for cell change of the terminal device with an indication of interruption free TA acquisition for a cell associated with the cell change, or per a panel indication of the terminal device; and causing an early synchronization to be triggered based on the report.

In an eighth aspect, there is provided a method. The method comprises receiving a preamble for a random access from a terminal device with an indication whether a serving panel of the terminal device or a non-serving panel of the terminal device is used for a layer 1 measurement for cell change of the terminal device, or whether an interruption free TA acquisition is to performed for a cell associated with the cell change; and transmitting TA information of the further distributed network device based on the indication.

In a ninth aspect, there is provided an apparatus comprising means for receiving, from a centralized network device, a configuration at least indicating that a L1 measurement for cell change is to be reported by the apparatus with an indication of interruption free TA acquisition for a cell associated with the cell change, or per a panel indication of the apparatus; and means for transmitting, to a distributed network device, a report of the L1 measurement based on the configuration.

In a tenth aspect, there is provided an apparatus comprising means for transmitting, to a terminal device, a configuration at least indicating that a L1 measurement for cell change is to be reported by the terminal device with an indication of interruption free TA acquisition for a cell associated with the cell change, or per a panel indication of the terminal device.

In an eleventh aspect, there is provided an apparatus comprising means for receiving, from a terminal device, a report of a L1 measurement for cell change of the terminal device with an indication of interruption free TA acquisition for a cell associated with the cell change, or per a panel indication of the terminal device; and means for causing an early synchronization to be triggered based on the report.

In a twelfth aspect, there is provided an apparatus comprising means for receiving a preamble for a random access from a terminal device with an indication whether a serving panel of the terminal device or a non-serving panel of the terminal device is used for a layer 1 measurement for cell change of the terminal device, or whether an interruption free TA acquisition is to performed for a cell associated with the cell change; and means for transmitting TA information of the further distributed network device based on the indication.

In a thirteenth aspect, there is provided a computer readable medium having a computer program stored thereon which, when executed by at least one processor of an apparatus, causes the apparatus to carry out the method according to the fifth aspect, the sixth aspect, the seventh aspect or the eighth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings.

FIG. 4 shows a flowchart of an example method of interruption time reduction according to some example embodiments of the present disclosure;

FIG. 5 shows a flowchart of an example method of interruption time reduction according to some example embodiments of the present disclosure;

FIG. 6 shows a flowchart of an example method of interruption time reduction according to some example embodiments of the present disclosure;

FIG. 7 shows a flowchart of an example method of interruption time reduction according to some example embodiments of the present disclosure;

Throughout the drawings, the same or similar reference numerals may represent the same or similar element.

DETAILED DESCRIPTION

Figure 1:
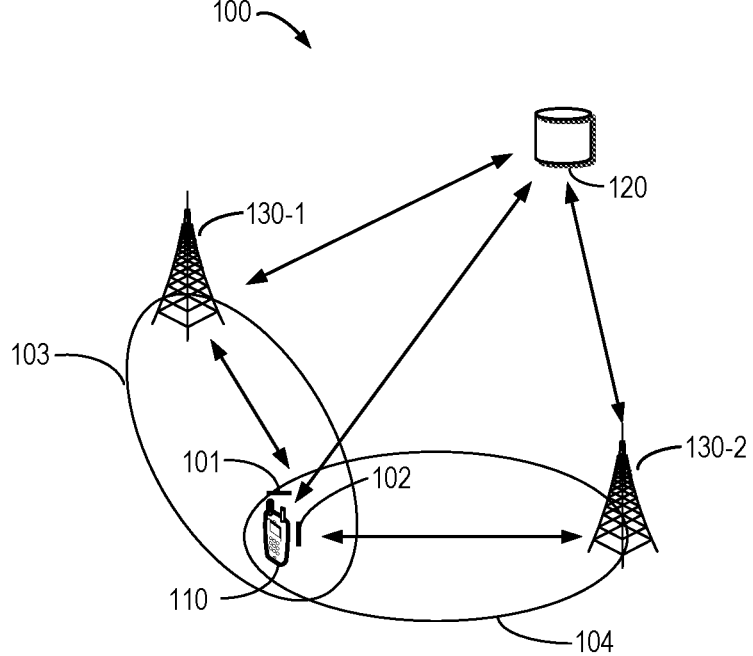
FIG. 1 illustrates an example environment in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein may be implemented in various manners other than the ones described below.

In the following description and claims, unless defined otherwise, all technical and scientific terms used herein may have the same meaning as commonly understood by one of ordinary skills in the art to which this disclosure belongs. References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second" and the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IOT), an Enhanced Machinetype communication (eMTC) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the terms "network device", "radio network device" and/or "radio access network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, the radio access network (RAN) split architecture includes a Centralized Unit (CU) and a Distributed Unit (DU). In some other example embodiments, part of the radio access network device or full of the radio access network device may embarked on an airborne or space-borne NTN vehicle.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains.

FIG. 1 shows an example communication network 100 in which embodiments of the present disclosure may be implemented. As shown in FIG. 1, the communication network 100 may comprise a terminal device 110 (hereinafter may also be referred to as a UE). The terminal device 110 may communicate with a centralized network device 120 (hereinafter may also referred to as a CU).

In some exemplary scenarios, the terminal device 110 may be a multi-panel UE (MPUE). For example, the terminal device 110 may be configured with two antenna arrays, namely 101 and 102, which can be arranged at different locations on the terminal device 110.

An MPUE may exhibit different implementations regarding its capabilities for simultaneous transmission/reception. For example, multiple panels are implemented on the UE and only one panel can be activated at a time, with a panel switching/activation delay of few milliseconds. It may also be possible that multiple panels are implemented on the UE and multiple panels may be activated at a time and one or more panels can be used for Tx, or multiple panels are implemented on the UE and multiple panels can be activated at a time but only one panel can be used for Tx.

The communication network 100 may also comprise a distributed network device 130-1 and a further distributed network device 130-2. The distributed network device 130-1 and a further distributed network device 130-2 may communicate with the centralized network device 120.

In some scenarios, the distributed network device 130-1 may manage a cell 103 serving the terminal device 110. If a link between the terminal device 110 and the cell 103 is getting worse, a handover procedure may be triggered. For example, the terminal device 110 may measure a cell 104 managed by the further distributed network device 130-2. In this case, the cell 103 serving the terminal device 110 may be considered as a serving cell and the cell 104 may be considered as a candidate cell. Moreover, the distributed network device 130-1 may act as a source distributed network device (hereinafter may also be referred to as a source DU) and the further distributed network device 130-2 may act as a target distributed network device (hereinafter may also be referred to as a target DU).

It is to be understood that the number of network devices and terminal devices and the number of antenna panels arranged at the terminal device 110 shown in FIG. 1 is given for the purpose of illustration without suggesting any limitations. The communication network 100 may include any suitable number of network devices, terminal devices and antenna panels.

TA is an important parameter which enables the network (NW) to estimate the time, it requires for the radio signal to reach from the UE to the gNB. It is important for the gNB of the target cell to estimate the TA information and share it with UE.

As describe above, the UE may be configured to acquire the TA for candidate cell(s) before the cell switch command is received, which may be called as early TA acquisition. When acquiring TA of the candidate cell(s) in LTM, at least Physical Downlink Control Channel (PDCCH) ordered Random Access Channel (RACH) is supported.

LTM is a highly effective delay tolerant mobility management procedure which operates on the fundamental premise of CU-DU split RAN architecture. The LTM procedure may be split in three phases, namely Preparation, Execution, and Completion.

In the preparation phase, the UE may send a L3 measurement report containing the measurements of serving and target cell(s). By Using the reported measurements, the CU can identify a potential set of candidate target cells to which the UE can be handed over to. In this example, the CU may identify candidate target cells that are served by either source DU or another DU (i.e., target DU) which are controlled by the same CU.

Then the CU may request the preparation of a candidate target cell controlled by the target DU by sending UE a Context Setup Request message. The target DU may provide the configuration of the UE in UE Context Setup Response messages, respectively, containing a container from DU to CU. The configuration may contain UE-specific and non-UE-specific parts.

The CU may further request the preparation of a candidate target cell controlled by the source DU by sending a UE Context Modification Request message. Similarly, the source DU may provide the configuration of the UE in UE Context Modification Response message containing a container from DU to CU. The configuration may contain UE-specific and non-UE-specific parts.

After receiving the UE configurations for the candidate target cell(s), the CU may generate an RRC Reconfiguration that is sent to the UE. Among other information, the Radio Resource Control (RRC) Reconfiguration message may contain measurement reporting configuration for Low Layer Mobility (LLM) and a configuration of the prepared candidate cell(s) which the UE needs to execute when it receives a L2 command to change the serving cell. Then the UE may confirm the RRC Reconfiguration to the network.

In the execution phase, the UE may perform a DL synchronization and TA acquisition with candidate target cell(s) (i.e., a UL synchronization). The synchronization step may not be necessarily performed right after RRC Reconfiguration is received. However, the synchronization for candidate cell(s) may be supported between the RRC Reconfiguration and cell switch command reception, at least based on System Synchronization Block (SSB). The TA acquisition of candidate cell(s) before LTM cell switch command may be supported, at least based on PDCCH ordered RACH, where the PDCCH order is only triggered by source cell.

After confirming the RRC Reconfiguration to the network, the UE may start to report the L1 beam measurement of serving and candidate target cells. It is to be understood that the UE does not necessarily wait for RRC Reconfiguration complete message to be sent to initiate the L1 measurement reporting. That is, the UE may start reporting the L1 measurements upon applying the new RRC configuration message.

Upon receiving multiple L1 measurement reports and determining that there is a target candidate cell having a better radio link/beam measurement than the serving cell, the serving cell may send a Medium Access Control (MAC) Control Element (MAC CE) to trigger the cell change to the target candidate cell. Then the handover from serving cell to target cell may be executed by the UE. Both RACH and RACH-less based cell change may be considered.

In the completion phase, the UE context may be released from the source DU.

As mentioned, the UE may perform the early UL/DL synchronization towards the candidate cells during LTM procedure. The DL synchronization is mainly performed via SSB measurements of the candidate cells where the UE can monitor those SSBs and calculate DL synchronization without interruption between UE and the serving cell DL. However, the uplink synchronization can lead both DL and UL interruption between the UE and the serving cell, which may cause the early synchronization procedure to be obsolete since the goal of the early synchronization intends to reduce the interruption during handover. Depending on the capability of the UE, the UE may need to detach from serving cell, perform RACH procedure to acquire TA for UL synchronization and attach back to the serving cell.

This interruption is inevitable for the UEs with single panel. For MPUEs, even if the MPUE can perform simultaneous UL or DL transmission on different panels, it may also be subject to interruption if the same panel is used for both serving cell connection and target cell UL synchronization. Otherwise, the UE may perform interruption free UL synchronization (when the MPUE may perform UL synchronization towards target cell on a panel different than the one that is used between MPUE and the serving cell). However, it is not known by the serving cell whether the UL synchronization triggered by the serving cell leads UL/DL interruption on the UE side.

Now the problem about the interruption may be further explained with reference to the scenario shown in FIG. 1. The terminal device 110 is arranged with antenna panels 101 and 102 and the terminal device 110 may receive 2 Reference Signal Received Power (RSRP), i.e., RSRP 1 and RSRP 2 at the panel 102 from the cell 103 and the cell 104. The terminal device 110 may report the L1-RSRP measurements to the cell 103 (the serving cell). The network is unaware which panel the UE has used for the report of the L1-RSRP measurements. In this case, if the distribute network device 130-1 (the source DU) commands TA acquisition for the cell 104 (the target cell) under same or different DU, the distribute network device 130-1 doesn't know whether the terminal device 110 will use same panel of the serving panel or different panel. Thus, when the TA acquisition is triggered by the distribute network device 130-1, it will cause interruption time as the terminal device 110 will use same panel for both cell 103 (the serving cell) UL/DL and TA acquisition of the cell 104 (the target cell).

Furthermore, if the distribute network device 130-1 is aware, the terminal device will use panel 101 to perform random access procedure towards the cell 104 and the panel 101 is not the serving panel that is used for the serving cell, the distribute network device 130-1 can trigger TA acquisition without worrying about any interruption time. However, there is no such information available in L1 measurement report. Thus, even if the distribute network device 130-1 is aware the terminal device 110 has multiple panels, the distribute network device 130-1 is unaware that whether TA acquisition will cause any interruption time.

Also considering that a report of panel diversity information to the centralized network device 120 through Layer 3 RRC messages may cause minimum 120 ms delay, the issue of latency minimization through efficient TA information acquisition under LTM scenario by MPUEs may need to be further discussed.

The solution of the present disclosure proposes a mechanism for interruption time reduction in LTM for MPUEs. In this solution, the terminal device 110 obtains a configuration of the L1 measurement for cell change at least indicating the L1 measurement report may be provided by the terminal device 110 with an indication of interruption free TA acquisition for a cell associated with the cell change or per a panel indication of the terminal device. Then the terminal device 110 transmit to a distributed network device 130-1, a report of the layer 1 measurement based on the configuration.

Example embodiments of the present disclosure will be described in detail below with reference to the accompanying drawings.

LLM is one of the objectives for mobility enhancement. In contrast to L3 mobility procedures where the handover between two cells is decided by the RRC layer, the LLM decision may be made by the MAC layer terminated in the distributed network device, i.e., DU.

Figure 2:
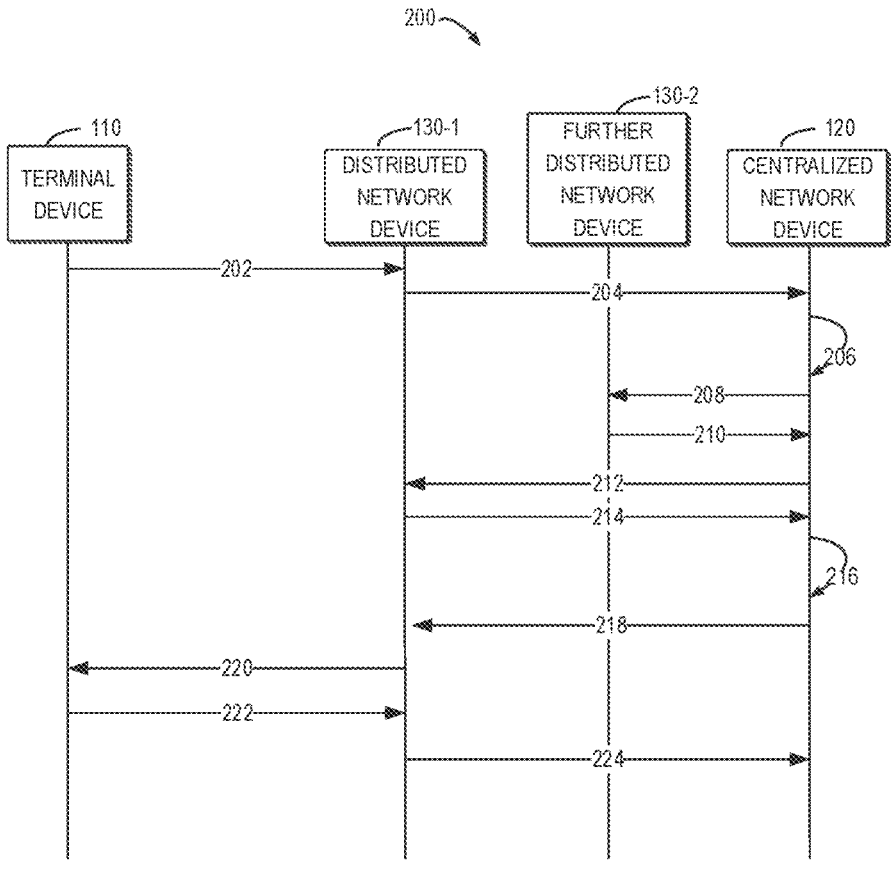
FIG. 2 shows a signaling chart of a process of interruption time reduction according to some example embodiments of the present disclosure.
Figure 3:
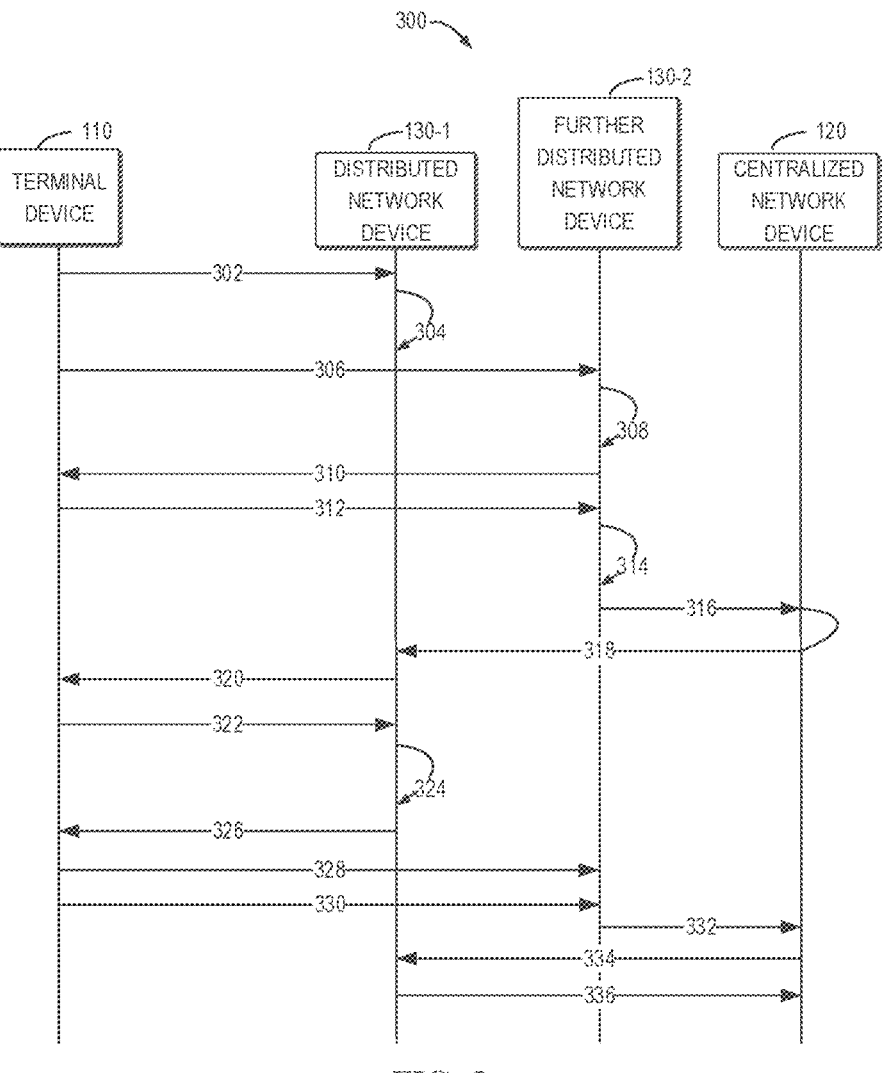
FIG. 3 shows a signaling chart of a process of interruption time reduction according to some example embodiments of the present disclosure.

FIGS. 2 and 3 show signalling diagrams of LLM from a serving cell in source DU to a target cell in target DU (i.e., inter-DU intra-CU scenario). It is to be understood that the processes shown in FIGS. 2 and 3 may also be applied as well in case of intra-DU intra-CU cell change where source DU would be the same as target DU. The procedure may be split in three phases, namely the preparation phase, the execution phase, and the completion phase. The FIG. 2 shows the process of the preparation phase while FIG. 3 shows the process of the execution and the completion phases.

Reference is now made to FIG. 2, which shows a signaling chart 200 for communication according to some example embodiments of the present disclosure. As shown in FIG. 2, the signaling chart 200 involves a terminal device 110, a centralized network device 120 and distributed network devices 130-1 and 130-2. For the purpose of discussion, reference is made to FIG. 1 to describe the signaling chart 200.

In an exemplary scenario, the distributed network device 130-1 may act as a source DU and manage a serving cell 103 of the terminal device 110, while the further distributed network device 130-2 may act as a target DU and manage a target cell 104 of the terminal device 110. It is to be understood that more target cells may also be available for the process 200.

As shown in FIG. 2, in the preparation phase, the terminal device 130 may transmit 202, to the distributed network device 130-1, a L3 measurement report containing the measurements of the serving cell 103 and a target cell 104 (more target cells are possible). The L3 measurement report may be forwarded 204 from the distributed network device 130-1 to the centralized network device 120.

Using the reported measurements, the centralized network device 120 may identify 206 a potential set of candidate target cells to which the terminal device 110 may be handed over to. In the exemplary scenario shown in FIG. 2, the centralized network device 120 may identify candidate target cells that are served by either distributed network device 130-1 (source DU) or the further distributed network device 130-2 (i.e., target DU) which are controlled by the same CU, i.e., the centralized network device 120.

Then the centralized network device 120 may request 208 the preparation of a candidate target cell controlled by the further distributed network device 130-2 by sending UE Context Setup Request message. The further distributed network device 130-2 may provide 210 the configuration of the UE in UE Context Setup Response messages, respectively, containing a container from DU to CU. The configuration may contain UE-specific and non-UE-specific parts.

Then the centralized network device 120 may request 212 the preparation of a candidate target cell (i.e., cell 103) controlled by the distributed network device 130-1 by sending UE Context Modification Request message. The distributed network device 130-1 may provide 214 the configuration of the terminal device 110 in UE Context Modification Response message containing a container from DU to CU. The configuration may contain UE-specific and non-UE-specific parts.

After receiving the UE Context Modification Response message, the centralized network device 120 may generate 216 a RRC configuration message that includes the measurement configuration of L1 cell change of the terminal device 110. The RRC configuration message may also indicate that the terminal device 110 may report the measurement with an indication of the interruption free TA acquisition for one or more cells that are reported in the L1 measurements. For example, 1 bit flag may be used to indicate whether the interruption free TA acquisition can be supported by the cell.

Optionally or alternatively, the RRC configuration message may also indicate that the terminal device 110 may report the measurement with a panel indication per L1 measurement based on MPUE capability of the terminal device 110.

For example, the trigger for L1 cell change and panel indication through L1 measurement may be based on an average latency experienced by the terminal device at the serving cell 103, a ratio of MPUE to single panel UE with the serving and the target cells, dynamic blockages and expected outage duration for MPUEs, L1 behaviour like the number of multi-paths components of the radio signal received at the multiple panels of the terminal device 110 and/or geographical area information with higher number of average radio link failures/handover failure (HOF).

Furthermore, the centralized network device 120 may also generate a DU configuration such that the distributed network device 130-1 will consider the interruption of the TA acquisition either by using 1 bit flag or panel diversity that is reported in L1 measurements from the terminal device 110 to the distributed network device 130-1, which may be outside of the RRC message.

Then the centralized network device 120 transmits 218 the RRC reconfiguration message for the terminal device 110 to report the L1 measurement, to the distributed network device 130-1 and the the distributed network device 130-1 may forward 220 the RR(' reconfiguration message to the terminal device 110.

It is to be understood that the distributed network device 130-1 cannot decode the RRC message and therefore the distributed network device 130-1 may simply relay the RR(reconfiguration message to the terminal device 110. If the centralized network device 120 also transmits the DU configuration as mentioned above, the distributed network device 130-1 may receive this DU configuration with the RRC message and know the interruption of the TA acquisition either by using 1 bit flag or panel diversity may be reported by the terminal device 110 along with the report of the L1 measurements.

Among other information as described above, the RRC Reconfiguration message may also include a measurement reporting configuration for LLM, i.e., a configuration on how to report the L1 beam measurements of serving and target cells and/or a configuration of the prepared candidate cell(s) which the terminal device 110 needs to execute when it receives a L2 command to change the serving cell, i.e., perform the handover.

Then the terminal device 110 may confirm 222 the RR(' Reconfiguration to the distributed network device 130-1 which may also be transferred 224 from the distributed network device 130-1 to the centralized network device 120.

Reference is now made to FIG. 3, which shows a signaling chart 300 for communication according to some example embodiments of the present disclosure. As shown in FIG. 3, the signaling chart 300 involves a terminal device 110, a centralized network device 120 and distributed network devices 130-1 and 130-2. For the purpose of discussion, reference is made to FIG. 1 to describe the signaling chart 300.

In an exemplary scenario, the distributed network device 130-1 may act as a source DU and manage a serving cell 103 of the terminal device 110, while the further distributed network device 130-2 may act as a target DU and manage a target cell 104 of the terminal device 110. It is to be understood that more target cells may also be available for the process 300.

As shown in FIG. 3, in the execution phase, after confirming the RRC' Reconfiguration, the terminal device 110 may start 302 to report the L1 beam measurement of serving and candidate target cells with 1 bit flag for interruption free TA acquisition or per panel indication periodically to the distributed network device 130-1. The distributed network device 130-1 may monitor the L1 measurement to monitor the radio condition of the serving cell (i.e., cell 103) and the target cell (i.e., cell 104).

For example, the terminal device 110 may add a flag to indicate whether interruption free TA acquisition is supported for the target cell. As another option, the terminal device 110 may add a flag with the L1 measurement(s) associated with the target cell to indicate if the measurement was done using the serving panel or a different panel. It is also possible that the panel index may be added with the target cell measurements.

It is to be understood that there could be multiple L1 measurement reports with panel indication received by the distributed network device 130-1 from the distributed network device 130-1. In case if the target cell radio condition is weaker than the serving cell, the distributed network device 130-1 will not trigger early synchronization and keep on measuring the L1 measurement reports. The other reason for not triggering early synchronization as soon as the terminal device 110 receives the RR(Reconfiguration because if the distributed network device 130-1 triggers early synchronization for TA acquisition and due to the weak radio condition, the decision to change the serving cell may be delayed, the TA information becomes old and inaccurate.

In some example embodiments, the distributed network device 130-1 may determine, based on the report the L1 beam measurement received from the terminal device 110, the L1 measurement for the serving and the candidate target cell is received at the different panels. In this case, the distributed network device 130-1 may decide 304 to trigger early synchronization response.

In this situation, the terminal device 110 may transmit 306 a RACH preamble to the further distributed network device 130-2 (managing a target cell associated with the cell change of the terminal device 110) with an indication that L1 measurement for the serving and the candidate target cell is performed by using different panels, i.e., the serving panel and the non-serving panel(s) or an interruption free TA acquisition is supported for the target cell. Then the further distributed network device 130-2 may estimate 308 the TA and transmit 310 the TA information directly to the non-serving panel of the terminal device 110. Thus, there is no DL interruption in this case.

In some other example embodiments, the distributed network device 130-1 may determine, based on the report the L1 beam measurement received from the terminal device 110, the L1 measurement for the serving and the candidate target cell is received at the same panel, i.e., the serving panel of the terminal device 110. In this case, the distributed network device 130-1 may decide 304 to wait to trigger early synchronization response.

If the early synchronization is triggered by the distributed network device 130-1 using the serving panel, the terminal device 110 may transmit 312 a RACH preamble to the further distributed network device 130-2 an indication that L1 measurement for the serving and the candidate target cell is performed by using a same panel or an interruption free TA acquisition is not supported. Then the further distributed network device 130-2 may estimate 314 the TA and relay 316 the TA information to the centralized network device 120. The centralized network device 120 may further relay 318 the TA information to the distributed network device 130-1. Then the TA information may be transferred 320 from the distributed network device 130-1 to the terminal device 110. For example, the MAC CE of the distributed network device 130-1 may trigger to transmit the TA to the terminal device 110. In this way the DL interruption may be avoid.

Then the distributed network device 130-1 may decode 324 for serving cell change based on the L1 measurement received 322 from the terminal device 110 and the MAC CE of the distributed network device 130-1 may trigger 326 the cell change. A RACHless handover mechanism between the terminal device 110 and the further distributed network device 130-2 is accomplished 328 and the RRC Reconfiguration Complete message may be sent 330 from the terminal device 110 to the further distributed network device 130-2 and UL RRC message transfer may be sent 332 from the further distributed network device 130-2 to the centralized network device 120.

In the completion phase, the UE context may be released 324 from the distributed network device 130-1 and a path switch may be performed to the further distributed network device 130-2 (the new serving DU) and UJE context release message may be sent from the distributed network device 130-1 to the centralized network device 120.

Furthermore, in the solution of the present disclosure, the MPUEs capabilities of the terminal device 110 may also be reported or indicated. The MPUEs capabilities of the terminal device 110 that could be reported or indicated may comprise a total number of panels in the terminal device 110, for example, via the L3 measurement report; the panel used for the serving cell and the target cell measurement, for example, by a flag indication; if best panel measurement is reported for each cell or only the serving panel, for example, by a flag indication; information about Tx/Rx chains to support multiple simultaneous UL transmission; and/or Ofn (Individual Panel Offset) or Array Directivity Order (ADO) of the serving and non-serving panel.

In the solution of the present disclosure, a mechanism to inform the serving DU/cell whether the TA acquisition is subject to UL/DL interruption between UE and the serving DU/cell upon the TA acquisition is triggered. The simultaneous data transmission both in UL/DL may be through one panel with the serving cell while the other panels may be used to send the PRACH message (e.g., Message 1) to the target cell and acquire TA information. In this way, the interruption may be avoided and the panels of the MPUEs may be better utilized.

FIG. 4 shows a flowchart of an example method 400 of interruption time reduction according to some example embodiments of the present disclosure. The method 400 may be implemented at the terminal device 110 as shown in FIG. 1. For the purpose of discussion, the method 400 will be described with reference to FIG. 1.

At 410, the terminal device 110 receives, from a centralized network device, a configuration at least indicating that a L1 measurement for cell change is to be reported by the terminal device with an indication of interruption free TA acquisition for a cell associated with the cell change, or per a panel indication of the terminal device.

At 420, the terminal device 110 transmits, to a distributed network device, a report of the L1 measurement based on the configuration.

In some example embodiments, the configuration is received via a RRC message.

In some example embodiments, the configuration is forwarded from the centralized network device to the terminal device by the distributed network device.

In some example embodiments, the configuration further comprises at least one of a measurement reporting configuration for a low layer mobility, or a configuration of one or more candidate cells associated with the cell change.

In some example embodiments, the terminal device may transmit the report of the layer 1 measurement associated with the cell with at least one of an indication whether the layer 1 measurement is performed by a serving panel of the terminal device or a non-serving panel of the terminal device, an index of a panel of the terminal device that performs the layer 1 measurement of the cell, or an indication whether the interruption free TA is to be performed for the cell.

In some example embodiments, in accordance with a determination that an early synchronization is triggered by the distributed network device, the terminal device may transmit, to a further distributed network device, a preamble for a random access with an indication whether a serving panel of the terminal device or a non-serving panel of the terminal device is used the layer 1 measurement, or whether an interruption free TA acquisition is performed for a cell associated with the cell change; and receive TA information of the further distributed network device.

In some example embodiments, the terminal device may receive the TA information from the further distributed network device or from the distributed network device forwarded by the centralized network device.

FIG. 5 shows a flowchart of an example method 500 of interruption time reduction according to some example embodiments of the present disclosure. The method 500 may be implemented at the centralized network device 120 as shown in FIG. 1. For the purpose of discussion, the method 500 will be described with reference to FIG. 1.

At 510, the centralized network device 120 transmits, to a terminal device, a configuration at least indicating that a L1 measurement for cell change is to be reported by the terminal device with an indication of interruption free TA acquisition for a cell associated with the cell change, or per a panel indication of the terminal device.

In some example embodiments, the configuration is received via a RRC message.

In some example embodiments, the configuration is forwarded from the centralized network device to the terminal device by the distributed network device.

In some example embodiments, the configuration further comprises at least one of a measurement reporting configuration for a low layer mobility, or a configuration of one or more candidate cells associated with the cell change.

In some example embodiments, the centralized network device 120 may transmit, to the distributed network device, an indication that the layer 1 measurement for the cell change is to be reported by the terminal device with the indication of interruption free TA acquisition for the cell associated with the cell change, or per the panel indication of the terminal device.

In some example embodiments, the centralized network device 120 may receive, from a further distributed network device, TA information of the further distributed network device; and transmit the TA information to the terminal device via the distributed network device.

FIG. 6 shows a flowchart of an example method 600 of interruption time reduction according to some example embodiments of the present disclosure. The method 600 may be implemented at the distributed network device 130-1 shown in FIG. 1. For the purpose of discussion, the method 600 will be described with reference to FIG. 1.

At 610, the distributed network device 130-1 receives, from a terminal device, a report of a L1 measurement for cell change of the terminal device with an indication of interruption free TA acquisition for a cell associated with the cell change, or per a panel indication of the terminal device.

At 620, the distributed network device 130-1 causes an early synchronization to be triggered based on the report.

In some example embodiments, the distributed network device 130-1 may receive the report of the layer 1 measurement associated with the cell with at least one of an indication whether the layer 1 measurement is performed by a serving panel of the terminal device or a non-serving panel of the terminal device, an index of a panel of the terminal device that performs the layer 1 measurement of the cell, or an indication whether the interruption free TA is to be performed for the cell.

In some example embodiments, the distributed network device may forward, from a centralized network device and to the terminal device, a configuration at least indicating that a layer 1 measurement for cell change is to be reported by the terminal device with an indication of interruption free timing advance, TA, acquisition for a cell associated with the cell change, or per a panel indication of the terminal device.

In some example embodiments, the distributed network device may receive, from a centralized network device, an indication that the layer 1 measurement for the cell change is to be reported by the terminal device with the indication of interruption free TA acquisition for the cell associated with the cell change, or per the panel indication of the terminal device.

In some example embodiments, the distributed network device may receiving, from a centralized network device, TA information of a further distributed network device; and transmitting the TA information to the terminal device.

FIG. 7 shows a flowchart of an example method 700 of interruption time reduction according to some example embodiments of the present disclosure. The method 700 may be implemented at the further distributed network device 130-2 as shown in FIG. 1. For the purpose of discussion, the method 700 will be described with reference to FIG. 1.

At 710, the further distributed network device 130-2 receives, from a terminal device, a preamble for a random access with an indication whether a serving panel of the terminal device or a non-serving panel of the terminal device is used the layer 1 measurement, or whether an interruption free TA acquisition is performed for a cell associated with the cell change.

At 720, the further distributed network device 130-2 transmits a TA information of the further distributed network device 130-2 based on the indication.

In some example embodiments, a target cell associated with the cell change is managed by the further distributed network device 130-2, if the further distributed network device 130-2 determines, based on the indication, that the layer 1 measurements for a serving cell and the target cell associated with the cell change are performed by different panels or an interruption free TA acquisition is to be performed for the candidate cell, the further distributed network device 130-2 may transmit the TA information to the terminal device or if the further distributed network device 130-2 determines, based on the indication, that the layer 1 measurements for a serving cell and the target cell associated with the cell change are performed by a same panel or an non-interruption free TA acquisition is to be performed for the serving cell, the further distributed network device 130-2 may transmit the TA information to a distributed network device via a centralized network device.

In some example embodiments, an apparatus capable of performing the method 400 (for example, implemented at the terminal device 110) may include means for performing the respective steps of the method 400. The means may be implemented in any suitable form. For example, the means may be implemented in a circuitry or software module.

In some example embodiments, the apparatus comprises means for receiving, from a centralized network device, a configuration at least indicating that a L1 measurement for cell change is to be reported by the apparatus with an indication of interruption free TA acquisition for a cell associated with the cell change, or per a panel indication of the apparatus; and means for transmitting, to a distributed network device, a report of the L1 measurement based on the configuration.

In some example embodiments, an apparatus capable of performing the method 500 (for example, implemented at the centralized network device 120) may include means for performing the respective steps of the method 500. The means may be implemented in any suitable form. For example, the means may be implemented in a circuitry or software module.

In some example embodiments, the apparatus comprises means for transmitting, to a terminal device, a configuration at least indicating that a L1 measurement for cell change is to be reported by the terminal device with an indication of interruption free TA acquisition for a cell associated with the cell change, or per a panel indication of the terminal device.

In some example embodiments, an apparatus capable of performing the method 600 (for example, implemented at the distributed network device 130-1) may include means for performing the respective steps of the method 600. The means may be implemented in any suitable form. For example, the means may be implemented in a circuitry or software module.

In some example embodiments, the apparatus comprises means for receiving, from a terminal device, a report of a L1 measurement for cell change of the terminal device with an indication of interruption free TA acquisition for a cell associated with the cell change, or per a panel indication of the terminal device; and means for causing an early synchronization to be triggered based on the report.

In some example embodiments, an apparatus capable of performing the method 700 (for example, implemented at the further distributed network device 130-2) may include means for performing the respective steps of the method 700. The means may be implemented in any suitable form. For example, the means may be implemented in a circuitry or software module.

In some example embodiments, the apparatus comprises means for receiving a preamble for a random access from a terminal device; and means for transmitting a TA information of the apparatus to the terminal device.

Figure 8:
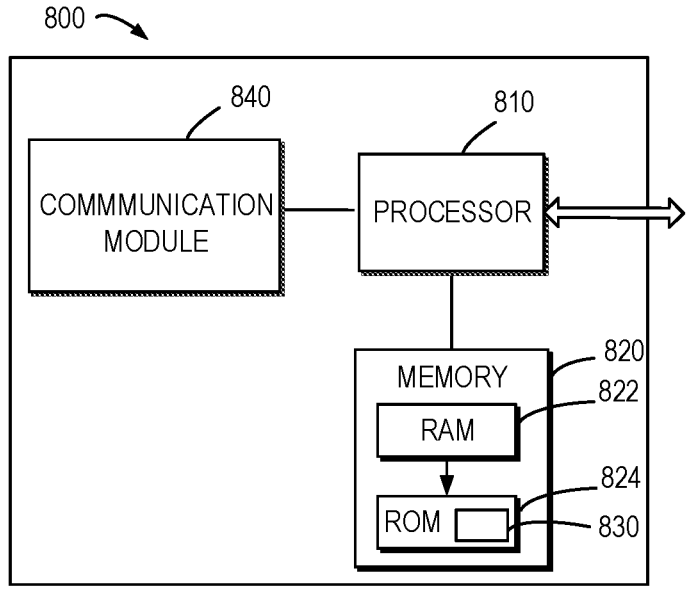
FIG. 8 shows a simplified block diagram of a device that is suitable for implementing example embodiments of the present disclosure.

FIG. 8 is a simplified block diagram of a device 800 that is suitable for implementing example embodiments of the present disclosure. The device 800 may be provided to implement a communication device, for example, the distributed network device 130-1 or 130-2, the centralized network device 120 or the terminal device 110 as shown in FIG. 1. As shown, the device 800 includes one or more processors 810, one or more memories 820 coupled to the processor 810, and one or more communication modules 840 coupled to the processor 810.

The communication module 840 is for bidirectional communications. The communication module 840 has one or more communication interfaces to facilitate communication with one or more other modules or devices. The communication interfaces may represent any interface that is necessary for communication with other network elements. In some example embodiments, the communication module 840 may include at least one antenna.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 822 and other volatile memories that will not last in the power-down duration.

A computer program 830 includes computer executable instructions that are executed by the associated processor 810. The instructions of the program 830 may include instructions for performing operations/acts of some example embodiments of the present disclosure. The program 830 may be stored in the memory, e.g., the ROM 824. The processor 810 may perform any suitable actions and processing by loading the program 830 into the RAM 822.

The example embodiments of the present disclosure may be implemented by means of the program 830 so that the device 800 may perform any process of the disclosure as discussed with reference to FIG. 2 to FIG. 7. The example embodiments of the present disclosure may also be implemented by hardware or by a combination of software and hardware.

In some example embodiments, the program 830 may be tangibly contained in a computer readable medium which may be included in the device 800 (such as in the memory 820) or other storage devices that are accessible by the device 800. The device 800 may load the program 830 from the computer readable medium to the RAM 822 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 9:
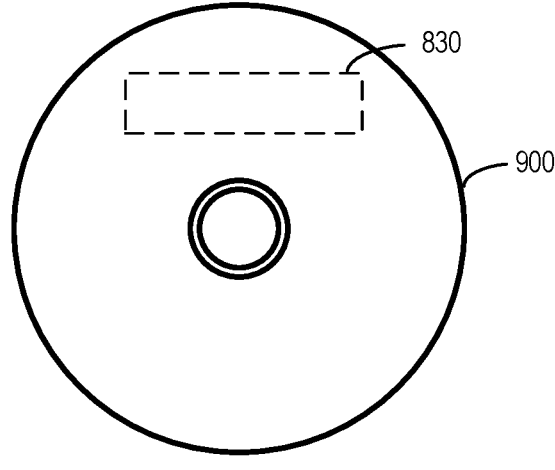
FIG. 9 shows a block diagram of an example computer readable medium in accordance with some embodiments of the present disclosure.

FIG. 9 shows an example of the computer readable medium 900 which may be in form of CD, DVD or other optical storage disk. The computer readable medium 900 has the program 830 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provides at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device comprising:

at least one processor; and a memory storing instructions that, when executed by the at least one processor, cause the terminal device at least to perform:

receiving, via a radio resource control (RRC) reconfiguration message forwarded from a centralized network device through a distributed network device, a configuration associated with low layer mobility during a low-tolerance mobility (LTM) procedure, the configuration including a layer-1 (L1) measurement report reporting configuration for layer-1 cell change;

parsing the configuration to determine that the L1 measurement report is to include:

(a) a one-bit flag indicating whether interruption-free timing-advance (TA) acquisition is supported for a candidate target cell associated with the cell change; and (b) a per-panel indication identifying whether a serving panel or a non-serving panel of a multi-panel user equipment (MPUE) of the terminal device performed a corresponding L1 measurement;

storing, in the memory, the measurement reporting configuration together with an identifier of each candidate target cell prepared under the LTM procedure;

performing, in accordance with the configuration, downlink synchronization measurements on one or more candidate target cells while maintaining uplink and downlink connectivity with a serving cell;

determining, for each measured candidate target cell, whether the L1 measurement is obtained by the serving panel or a non-serving panel of the MPUE;

indicating that interruption-free TA acquisition is supported by setting the one-bit flag to a first value when the non-serving panel performs the L1 measurement;

generating a layer-1 measurement report including, for each candidate target cell, the one-bit flag;

transmitting, to the distributed network device, the layer-1 measurement report including the one-bit flag via an uplink control channel;

receiving, from the distributed network device, an indication that an early synchronization is to be triggered based on the layer-1 measurement report;

in response to the indication, transmitting, to a further distributed network device managing a target cell associated with the cell change, a random-access (RA) preamble including an indication whether the serving panel or the non-serving panel of the terminal device is used for the measurement, or whether interruption-free TA acquisition is supported for the candidate target cell;

receiving, from the further distributed network device, TA information corresponding to the random-access preamble, the TA information being received directly when interruption-free acquisition is supported or indirectly via the centralized and distributed network devices when interruption-free acquisition is not supported; and applying the received TA information to update uplink timing for subsequent transmissions associated with the target cell while maintaining downlink connectivity with the serving cell.

2. The terminal device of claim 1, wherein the one-bit flag is set to indicate that interruption-free TA acquisition is supported.

3. The terminal device of claim 2, wherein generating the layer-1 measurement report is triggered when a downlink reference signal received power (RSRP) of a candidate target cell exceeds an RSRP of a serving cell by a predefined threshold.

4. The terminal device of claim 3, wherein the RRC reconfiguration message comprises an indication that the measurement reporting configuration for layer-1 cell-change reporting is associated with a low-layer mobility configuration identified by a unique configuration identifier.

5. The terminal device of claim 4, wherein the random-access preamble is a physical random-access channel (PRACH) preamble that is PDCCH-ordered, the order being triggered by the serving cell.

6. The terminal device of claim 5, wherein both the one-bit flag and the per-panel indication are included in a same layer-1 measurement report message transmitted to the distributed network device.

7. The terminal device of claim 6, wherein the uplink control channel used for transmitting the layer-1 measurement report comprises a physical uplink control channel (PUCCH).

8. The terminal device of claim 7, wherein the indication received from the distributed network device to trigger early synchronization is received within 120 milliseconds after confirmation of the radio resource control reconfiguration message.

9. The terminal device of claim 8, wherein maintaining downlink connectivity with the serving cell during reception of the TA information comprises maintaining physical downlink control channel monitoring on the serving panel.

10. The terminal device of claim 9, wherein storing the measurement reporting configuration together with the identifier of each candidate target cell further comprises associating each identifier with a cell index and a beam identifier corresponding to a synchronization signal block of the candidate target cell.

* * * * *